3,349,044
PROCESS FOR POLYMERIZATION OF VIC-EPOXY COMPOUNDS WITH ALUMINUM HYDROCARBYL-SALICYLIC ACID CATALYSTS
Ernst L. Th. M. Spitzer, Amsterdam, Netherlands, assignor to Shell Oil Company, New York, N.Y., a corporation of Delaware
No Drawing. Filed Mar. 23, 1964, Ser. No. 354,101
Claims priority, application Netherlands, May 31, 1963, 293,496
10 Claims. (Cl. 260—2)

ABSTRACT OF THE DISCLOSURE

A process for the polymerization of halogen-substituted vic-epoxy compounds (e.g. epichlorohydrin) wherein the catalyst for the polymerization comprises an aluminum hydrocarbyl compound combined with a hydrocarbyl-substituted salicylic acid.

---

The invention relates to the polymerization or co-polymerization of epoxy compounds and the preparation in this way of macromolecular, in particular rubber-like, products. Whenever in this specification the terms "polymerize," "polymerization" and "polymer" are used, these should be taken also to include "copolymerize," "copolymerization" and "copolymer," respectively.

Epoxy compounds can be polymerized into rubber-like compounds, with the aid of catalyst systems obtained from organic aluminum compounds and certain chelating agents, including those containing a hydroxyl group and another oxygen-containing group which produces a co-ordinate link with aluminum.

The yields of high molecular weight polymer obtained with many of these catalysts has been unsatisfactory, as will be brought out in the comparative data given hereinafter.

Now, in accordance with the present invention, it has now been found that the polymerization reaction can be accelerated considerably and the yield of the polymer increased by choosing as a chelating agent a salicylic acid in which one or more hydrocarbon radicals are present as ring substituents.

The invention may therefore be defined as relating to the polymerization and/or copolymerization of epoxy compounds, with the aid of catalyst systems obtained from one or more organic aluminum compounds, in which one aluminum atom is linked directly to at least one carbon atom, and one or more chelating agents containing a hydroxyl group and another oxygen-containing group, characterized in that salicylic acids in which one or more hydrocarbon radicals are present as substituents are used as chelating agents.

The hydrocarbon radicals being present in the salicylic acid as substituents may be aliphatic, cycloaliphatic or aromatic, or may belong to a mixed type, for example arylaliphatic, arylcycloaliphatic, alkylaromatic or cycloalkylaromatic. As a rule, the combined substituents contain from two to twenty carbon atoms. Salicylic acids which contain one or more alkyl groups as substituents in particular those alkyl groups which are linked to the aromatic nucleus by means of a tertiary or a quaternary carbon atom, are preferred.

Examples of suitable substituted salicylic acids are: di-isopropyl, di-sec-butyl, di-tert-butyl, tert-amyl, di-tert-amyl, di-n-butyl, n-hexyl, n-cyclohexyl, n-dodecyl, triiso-propyl, and phenylsalicylic acid.

Examples of epoxy compounds which may be polymerized according to the invention are: epoxyalkanes, such as ethylene oxide, propylene oxide, 1,2-epoxybutane, 2,3-epoxybutane, isobutylene oxide or 1,2-epoxy-2-methyl-propane, 1,2-epoxydodecane and diepoxybutane, substituted alkylene oxides, such as phenylepoxyethane, 1-methyl-1-phenylepoxyethane, halogen-substituted epoxyalkanes such as epichlorohydrin, epibromohydrin, 1-chloro-3,4-epoxybutane, 1-chloro-4,5-epoxypentane, 1,2-epoxy-2-methyl-3-chloropropane, 1,2-dichloro-3,4-epoxybutane, 1,1,1-trichloro-2,3-epoxypropane; and 1-dimethylamino-2,3-epoxypropane, cycloaliphatic epoxy compounds, such as cyclohexene epoxide or epoxycyclohexane, vinylcyclohexene monoepoxide, vinylcyclohexene diepoxide and alpha-pinene epoxide, epoxyalkyl ethers, in particular glycidyl ethers, such as methyl glycidyl ether, isopropyl glycidyl ether, vinyl glycidyl ether, allyl glycidyl ether, phenyl glycidyl ether, ethyl phenylglycidyl ether, cyclihexyl glycidyl ether, chloroethyl glycidyl ether and chlorophenyl glycidyl ether, epoxyalkyl esters, in particular glycidyl esters, such as glycidyl acetate, glycidyl propionate, glycidyl pivalate, glycidyl acrylate and glycidyl methacrylate.

Whenever used in this specification, the term "copolymerization" denotes the joint polymerization of epoxy compounds with each other and/or the joint polymerization of epoxy compounds with other monomers, such as aldehydes, for example, acetaldehyde, cyclic ethers, for example trioxane and tetrahydrofuran, olefinically unsaturated compounds, for example styrene and conjugated dienes, for example isoprene.

In the copolymerization of epoxy compounds with each other a polymer molecule is built up by uniting monomer molecules having a different constitution. The monomers which are no epoxy compounds combine far less readily with epoxides to form one macromolecule; in certain cases they even polymerize quite separately.

The presence of these other monomers may, however, stimulate the polymerization of epoxy compounds, so that not only the total quantity of polymer formed per unit time increases, but also the quantity of epoxy compound converted into the polymer per unit time.

The organic aluminum compounds acting as catalyst components in the process according to the invention, are compounds in which one aluminum atom is linked directly to at least one carbon atom. In general, these compounds may be represented by the formula

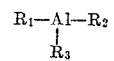

in which $R_1$ is an alkyl group, cycloalkyl group or aryl group, and $R_2$ and $R_3$, being similar or dissimilar to each other and to $R_1$, each represent an alkyl group, cycloalkyl group, aryl group, hydrogen atom or halogen atom; these compounds may also be used in the form of complexes such as the alkali metal aluminum tetraalkyl compounds. In the organic radicals linked to aluminum, other atoms or groups may be present as substituents for hydrogen atoms. For example, in an alkyl radical an aryl nucleus may be present as a substituent and in an aromatic radical an alkyl group. Furthermore, these organic radicals may contain as substituents for instance, hydroxyl groups or halogen atoms.

Examples of organic aluminum compounds are trialkylaluminum compounds, tricycloalkylaluminum compounds, triarylaluminum compounds, dialkylaluminum hydrides, monoalkylaluminum dihydrides, dialkyl aluminum halides and monoalkylaluminum dihalides. Examples of an alkali metal-aluminum tetraalkyl compound are the lithium aluminum tetraalkyls.

As a rule, the hydrocarbon radicals in the aluminum compounds contain no more than 12 carbon atoms, alkyl groups with at least 2 and at most 6 carbon atoms being preferred. The halogens in these compounds are in particular chlorine and bromine, preferably the former.

The molecular ratio in which the catalyst components are present has a great influence both on the rate and the yield of the polymerization and on the properties of the polymer. In general, the salicyclic acid derivative and the aluminum compound are in a mol ratio varying between 0.1:1 and 2:1. In general, the highest yields and molecular weights are obtained when this ratio is between 0.3:1 and 1:1, in particular between 0.4:1 and 0.8:1.

The ratio of the quantity of catalyst to the quantity of epoxy compound to be polymerized may vary within wide limits. Frequently, a catalyst concentration of 0.2–10 atoms of aluminum to 100 mole of epoxy compound is used.

As far as the epoxy compounds or the mixtures to be polymerized are liquid at the reaction temperature, the polymerization may be carried out without a diluent. In most cases, however, the use of an inert diluent is recommended. Very suitable diluents are, for example, saturated aliphatic, saturated cycloaliphatic and aromatic hydrocarbons, halogenized hydrocarbons and acyclic ethers.

The order in which the catalyst components, the monomers and the diluent are contacted with one another may vary. Catalyst components and monomers may each be added in one portion, with intervals or gradually. The best results have been obtained by first combining the catalyst components in a diluent, for example ether, and subsequently introducing the epoxy compound into the mixture gradually. It may be advantageous to subject the catalyst to an ageing process for some time, for example some minutes to some hours, after mixing the catalyst components in the diluent and before adding the epoxy compound. Very satisfactory results, however, have also been obtained with embodiments of the process in which the organic aluminum compound was introduced into the mixture last.

The process is preferably conducted in the absence of oxygen and carbon dioxide.

The temperature at which the polymerization takes place may vary widely. It is practically always carried out at temperatures between −80° C. and +150° C., mostly between 0 and 90° C. Pressures above atmospheric may be desirable to prevent the boiling of the reacting mixture. In case of a lower volatility of the compounds present, atmospheric or even subatmospheric pressure may be applied. The said temperatures may also prevail during the preliminary mixing of the catalyst components; for the ageing process of the catalyst, however, low or only moderately raised temperatures are recommended.

Both the preparation of the catalyst and the polymerization may take place batchwise or continuously, the latter method, if desired, in stirred reaction mixtures of constant composition.

*Example I.—Homopolymerization of epichlorohydrin*

Variation in the ratio of the catalyst components

Epichlorohydrin concentration _____ 1.8 mol/liter of diluent.
Diluent _____ 94% v. diethyl ether +6% v. 2,2,4-trimethylpentane.
Catalyst components _____ Aluminum triethyl, 0.07 mol/liter of diluent.
3,5-diisopropylsalicylic acid, variable quantity.
Order of addition _____ Diisopropylsalicylic acid epichlorohydrin, diluent, aluminum triethyl.
Reaction temperature ____ 40° C.
Reaction time _____ 4 hours.

The epichlorohydrin had been distilled and percolated through silica gel beforehand. The polymerization was carried out in a reactor from which the air had been displaced previously by means of dry nitrogen. The reaction was terminated by adding 50 ml. ethanol. Thereupon the mixture was filtrated to bring about a separation between the ether-soluble and insoluble polymer. The latter product, which was rubber-like was washed twice with diethyl ether, then stirred with a 1 percent solution of hydrogen chloride in ethanol, filtrated once more, washed to neutrality with methanol and next with a 0.4 percent solution of 4,4′-thio-bis(6-tert-butyl-m-cresol) in methanol; finally it was dried in vacuo at 50° C.

The ether-soluble in the polymer was recovered from the filtrated solution by evaporation.

| Mol. Ratio of Diisopropyl Salicylic Acid to Aluminum Triethyl | Yield, Percent w., Calculated on Monomer | | |
|---|---|---|---|
| | Ether-Insoluble | Ether-Soluble | Total |
| 0.00 | 3 | 13 | 16 |
| 0.25 | 43 | 16 | 59 |
| 0.40 | 53 | 14 | 67 |
| 0.50 | 61 | 16 | 77 |
| 0.60 | 58 | 24 | 82 |
| 0.67 | 56 | 24 | 80 |
| 0.75 | 53 | 25 | 78 |
| 1.00 | 43 | 26 | 69 |

From the table, it is evident that the yield of the ether-insoluble, rubber-like polymer is highest at a molecular ratio of diisopropylsalicylic acid to aluminum triethyl of 0.5:1 to 0.6:1. On the whole, the yield of the ether-soluble oily polymer shows a rise when the ratio of the catalyst components increases.

*Example II.—Homopolymerization of epichlorohydrin*

For the sake of comparison, not according to the invention.

Salicylic acid or phenylglyoxaldoxime as chelating agent.

Apart from the replacement of diisopropylsalicylic acid by another chelating agent, conditions were similar to those of Example I.

| Chelating Agent | Mol. Ratio Chelating Agnet/Al(C₂H₅)₃ | Yield, Percent w., Calculated on Monomer | | |
|---|---|---|---|---|
| | | Ether-Insoluble | Ether-Soluble | Total |
| Salicylic acid | 0.25 | 11 | 17 | 28 |
| | 0.50 | 14 | 19 | 33 |
| | 0.75 | 14 | 19 | 33 |
| | 1.00 | 7 | 18 | 25 |
| Phenylglyoxaldoxime | 0.25 | 4.0 | 33 | 37 |
| | 0.50 | 1.5 | 3.0 | 4.5 |
| | 0.75 | 0.0 | 3.5 | 3.5 |

*Example III.—Homopolymerization in epichlorohydrin*

Variation of the reaction time.

A series of experiments was made in which the molecular ratio of diisopropylsalicylic acid to aluminum triethyl was maintained at 0.50. The reaction time varied between 2 and 6 hours. All other conditions were the same as in Example I.

| Time, hours | Yield, percent w., Calculated on Monomer | | |
|---|---|---|---|
| | Ether-Insoluble | Ether-Soluble | Total |
| 2 | 40 | 24 | 64 |
| 4 | 61 | 16 | 77 |
| 6 | 60 | 34 | 94 |

After 4 hours the yield of the ether-insoluble, rubber-like polymer did not increase any further, whereas that of the ether-soluble polymer did.

*Example IV.—Homopolymerization of epichlorohydrin*

Gradual addition of monomer.

| | |
|---|---|
| Epichlorodyrin, total amount added | 1.8 mol/liter of diluent. |
| Diluent | 94% v. diethyl ether+6% v. 2,2,4-trimethylpentane. |
| Catalyst components | Aluminum triethyl 0.067 mol/liter of diluent. 3,5-diisopropylsalicylic acid, variable quantity. |
| Order of addition | Diluent, diisopropylsalicylic acid, alumnium triethyl, next in the course of 4 hours the epichlorohydrin. |
| Reaction temperature | 40° C. |
| Reaction time | 4 hours. |
| Working-up | Analogous to Example I. | coagulum which was filtered off, washed with a mixture of methanol and water, stabilized by means of a treatment with a 0.4 percent solution of 4,4′-thio-bis-(6-tert-butyl-m-cresol) in methanol-water and dried in vacuo at 50° C. The yields of these coagula have been entered in the table below under the heading "insoluble polymer, yield."

As far as copolymerizations with compounds other than epoxy compounds are concerned, this column indicates the yield of the ether-insoluble polymer.

In two experiments on the copolymerization of epichlorohydrin with propylene oxide both in ether-soluble polymer and (after filtering off this polymer, replacement of ether by benzene and addition of methanol as described before) a coagulum was obtained. For these two cases the column just mentioned contains two numbers placed above each other, the upper one representing the yield of the ether-insoluble polymer and the lower one the yield of the coagulum.

| Comonomer | Content of Comonomer in Original Monomer Mixture, percent m. | Mol. Ratio of Diisopropyl-salicylic Acid to Aluminum Triethyl | Insoluble Polymer | | Soluble Polymer | | Total Yield, percent w. |
|---|---|---|---|---|---|---|---|
| | | | Yield, percent w. | Content of Polymerized Comonomer, percent m. | Yield, percent w. | Content of Polymerized Comonomer, percent m. | |
| Propylene oxide | 51.5 | 0.75 | 10 | 61 | 30 | 83 | 40 |
| | 25.6 | 0.75 | 33 | 46 | 26 | 75 | 59 |
| | 17.0 | 0.50 | 9)34 25) | 15)25 31) | 27 | 17 | 61 |
| | 10.5 | 0.50 | 21)38 17) | 12)20 29) | 26 | 3 | 64 |
| Epoxy dodecane | 50.0 | 0.75 | 14 | 58 | 18 | 80 | 32 |
| | 9.3 | 0.50 | 30 | 22 | 13 | 59 | 43 |
| Allyl glycidyl ether | 48.5 | 0.75 | 5 | 62 | 40 | 49 | 45 |
| | 10.0 | 0.50 | 18 | 25 | 11 | 69 | 29 |
| Trioxane | 18.0 | 0.50 | 62 | 4 | 8 | 49 | 70 |
| Tetrahydrofuran | 20.5 | 0.50 | 24 | 5 | 24 | 47 | 48 |
| Styrene | 24.5 | 0.50 | 52 | 3 | 48 | | 100 |
| Isoprene | 51 | 0.50 | 41 | 5 | 21 | | 62 |
| | 24 | 0.50 | 60 | 4 | 34 | 40 | 94 |
| None | 0 | 0.75 | 53 | 0 | 25 | 0 | 78 |
| | 0 | 0.50 | 61 | 0 | 15 | 0 | 77 |

The viscosity of the diethyl ether-insoluble polymer was determined in a 0.1 percent solution of this polymer in dimethyl formamide at 50° C., which solution contained at the same time 0.5% 2,2′-methylene-bis(4-methyl-6-tertbutylphenol). From the values found, the reduced specific viscosity (RSV) was calculated.

| Mol. Ratio of Diisopropyl-Salicylic Acid to Aluminum Triethyl | Yield, percent w., Calculated on Monomer | | | RSV |
|---|---|---|---|---|
| | Ether-Insoluble | Ether-Soluble | Total | |
| 0.75 | 74 | 12 | 86 | 3.6 |
| 1.00 | 49 | 21 | 70 | 3.7 |

*Example V.—Copolymerization of epichlorohydrin*

Conditions were the same as in Example I, except for the addition of a mixture of epichlorohydrin and another monomer instead of epichlorohydrin, total concentration 1.8 mol/liter of diluent.

The copolymerization of epichlorohydrin with other epoxy compounds in most cases did not produce any diethyl ether-insoluble polymer. In these cases the solution was treated with diluted hydrochloric acid to remove the inorganic constituents and then washed with water. After that benzene was added and the ether distilled off. The solution of the polymer in benzene was poured out into the tenfold volume of a mixture of 75% v. methanol and 25% v. water. This treatment resulted in a rubber-like The columns with the heading "Content of polymerized Comonomer, percent m." indicate to what extent the comonomer contributed to the making of the product, i.e., what percentage of the monomer molecules which have been polymerized in the product were comonomer molecules which have been polymerized in the product were comonomer molecules. It has not been ascertained to what extent the comonomers are present in the product as homopolymers.

A comparison with the results of homopolymerization of epichlorohydrin leads to the following conclusions:

The replacement of epichlorohydrin by the other epoxy compounds has decreased the yield, in particular the yield of the rubber-like fractions; proportionally more comonomer than epichlorohydrin has been polymerized.

The replacement of epichlorohydrin by other monomers which are not epoxy compounds results in only slight copolymerization of these other monomers to rubber-like products. In various cases, however, a higher production is obtained in this process than in homopolymerization, so that vis-a-vis epichlorohydrin a rise in polymerization yield is noted.

A moderate quantity of isoprene has little influence on the yield of the rubber-like fraction, calculated on the total monomer, but increases the yield of the polymer with a lower molecular weight. Neither does trioxane exercise a great influence on the yield of rubber-like products, calculated on the total of monomer, but it reduces the fraction with a low molecular weight. Styrene stimulates the polymerization to such a degree that under the prevailing conditions all of the monomer is converted. This stimulus benefits especially the fraction with a low molecular weight.

All three comonomers improve the polymerization yield of epichlorohydrin (i.e., the ratio of polymerized epichlorohydrin to epichlorohydrin initially present×100%) as far as the formation of rubber-like polymer is concerned. Trioxane lowers the polymerization yield of epichlorohydrin as far as the fraction with a low molecular weight is concerned. Consequently, of the three comonomers trioxane is the most favorable for the preparation of the rubber-like polymer.

From comparable data of the above table (ratio of the catalyst components 0.50, comonomer content in the original monomer mixture 18 to 24.5 w.) the following values for the polymerization yields of epichlorohydrin can be calculated.

| Comonomer | Polymerization Yield of Epichlorohydrin | | |
|---|---|---|---|
| | Insoluble Polymer, Percent | Soluble Polymer, Percent | Total, Percent |
| None | 61 | 16 | 77 |
| Trioxane | 72 | 5 | 77 |
| Styrene | 69 | 31 | 100 |
| Isoprene | 72 | 28 | 100 |

I claim as my invention:

1. A process for the polymerization of epoxide compounds which comprises polymerizing monomeric halogen-substituted vic-epoxy compounds at about −80° C. to about +150° C. in the presence of a catalyst comprising an aluminum hydrocarbyl compound and a hydrocarbyl-substituted salicylic acid, said acid having at least one hydrocarbyl substituent directly attached to the aromatic nucleus of the acid, the molar ratio of hydrocarbyl-substituted salicylic acid to aluminum compound being between about 0.1 and 2.1.

2. A process according to claim 1 in which the epoxide is a halogen-substituted epoxyalkane.

3. A process according to claim 1 wherein the epoxide is an epihalohydrin.

4. A process according to claim 1 wherein the epoxide is epichlorohydrin.

5. A process according to claim 1 wherein the substituted salicylic acid bears at least one hydrocarbyl substituent directly attached to the aromatic nucleus by means of a tertiary carbon atom.

6. A process according to claim 1 wherein the substituted salicylic acid is a di(isoalkyl) salicylic acid.

7. A process according to claim 1 wherein the substituted salicylic acid is diisopropyl salicylic acid.

8. A process according to claim 1 wherein the aluminum compound is a trialkyl aluminum.

9. A process according to claim 1 wherein the aluminum compound is triethyl aluminum.

10. A process for the production of polymerized epoxide compounds which comprises polymerizing epichlorohydrin at temperatures between about 0° C. and 90° C. in the presence of aluminum triethyl and diisopropyl salicylic acid, the molar ratio of acid to aluminum triethyl being between about 0.3 and 1.0.

References Cited

UNITED STATES PATENTS 2,703,765  3/1955  Osdal _____ 260—47
3,135,706  6/1964  Vandenberg _____ 260—47

WILLIAM H. SHORT, *Primary Examiner.*

T. PERTILLA, *Assistant Examiner.*